3,538,082
5-(2-AMINOPHENYL)-2,3-DIHYDRO-1H-
BENZODIAZEPINE-7-SULFONAMIDES
Stanley C. Bell, Narberth, and Carl Gochman, Philadelphia, Pa., assignors to American Home Products Corporation, New York, N.Y., a corporation of Delaware
No Drawing. Filed Nov. 9, 1967, Ser. No. 681,906
Int. Cl. C07d 53/06
U.S. Cl. 260—239                                       5 Claims

ABSTRACT OF THE DISCLOSURE

This invention is concerned with 5-(2-aminophenyl)-2,3-dihydro-1H-1,4-benzodiazepine-7-sulfonamides which are pharmacologically active especially as central nervous system depressants.

---

The present invention relates to new and novel benzodiazepine sulfonamides. More particularly, this invention is concerned with 5-(2-aminophenyl)-2,3-dihydro-1H-1,4-benzodiazepine-7-sulfonamides which have depressant properties when tested under standard and accepted pharmacological procedures. They are, therefore, deemed to possess utility in experimental and comparative pharmacology.

The new and novel compounds within the purview of the present invention are exemplified by those having the following formula:

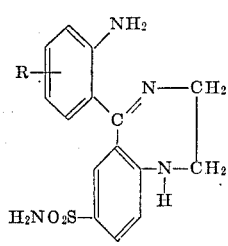

wherein R is selected from the group consisting of hydrogen, halogen, lower alkyl and lower alkoxy; and the biologically acceptable acid-addition salts thereof. The terms "lower alkyl" and "lower alkoxy" as employed herein are meant to include both branched and straight chain moieties having from about one to about eight carbon atoms. Typical examples of these compounds are: 5 - (2 - amino - 5 - chlorophenyl) - 2,3 - dihydro - 1H-1,4-benzodiazepine-7-sulfonamide; 5-(2-amino-5-bromophenyl) - 2,3 - dihydro - 1H - 1,4 - benzodiazepine - 7-sulfonamide; 5-(2-amino-4-tolyl)-2,3-dihydro-1H-1,4-benzodiazepine-7-sulfonamide; and 5-(2-aminophenyl)-2,3-dihydro-1H-1,4-benzodiazepine-7-sulfonamide.

The new and novel benzodiazepine sulfonamides of the present invention are prepared by the process illustrated in the following reaction scheme:

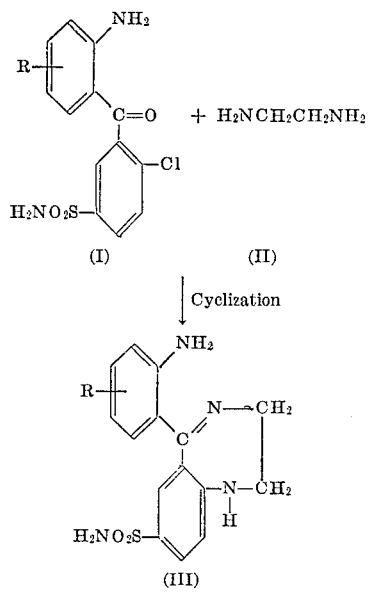

where R is defined as above. The cyclization reaction is effected by reacting an appropriate 2-amino-2'-chloro-5'-sulfamoylbenzaphenone (I) with ethylene diamine (II) at about reflux temperatures for a period of about three to about ten hours.

When the cyclization reaction is complete, the resulting 5 - (2-aminophenyl)-2,3-dihydro-1H-1,4-benzodiazepine-7-sulfonamide (III) is separated by routine recovery procedures. For example, the reaction mixture is concentrated, reconstituted in an alkanol and the product (III) separated as a precipitate by the addition of water.

Since many of the benzodiazepine sulfonamides of the present invention are basic, advantage may be taken of the water solubility of salts of these compounds formed with acids in the isolation and purification of the above compounds and in the preparation of aqueous solutions of these new compounds for parenteral administration. Of course, only salts formed with biologically acceptable acids should be employed in therapeutic applications. Particularly effective salts are those formed with biologically acceptable acids having a pK value of 3 or lower. Such acids are well known in the art, for example, hydrochloric, hydrobromic, sulfuric, nitric, phosphoric, benzenesulfonic, toluenesulfonic, methanesulfonic, ethanesulfonic acids and the like. These salts may be prepared by procedures commonly employed in the art, for example, reacting the compounds with an equivalent of the selected acid in aqueous solution and concentration of the solution. The 2-amino-2'-chloro-5' - sulfamoylbenzophenones (I) employed as starting materials in the above process are commercially available or may easily be prepared by procedures well known to those skilled in the art of chemistry.

The new and novel benzodiazepine sulfonamides of the present invention possess valuable pharmacological activity. In particular these new compounds, in standard pharmacological procedures, demonstrate nervous system activity and are useful as depressants. Because of this property they are of importance in experimental and comparative pharmacology.

In the pharmacological evaluation of the central nervous system depressant compounds of this invention the invivo effects of the instant compounds were tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjectiny each animal to a maximal electroshock to test for anti-convulsant activity.

The compounds of this invention in the above test procedure induce decreased motor activity at 127 mg./kg., and sedative-ataxic effects at 400 mg./kg. There were no deaths in the test animals at the highest does used, 400 mg./kg., intraperitoneally.

The following examples are given by way of illustration and are not to be construed as limitations of this invention, many variations of which are possible without departing from the scope and spirit thereof.

EXAMPLE I

A mixture of 5.0 g. of 2-amino-2′,5-dichloro-5′-sulfamoylbenzophenone and 25 ml. of ethylene diamine are refluxed for five hours. Thereafter, the excess amine is removed in vacuo and the residue dissolved in ethanol and precipitated by the addition of water to afford 5-(2-amino-5 - chlorophenyl) - 2,3 - dihydro - 1H - 1,4 - benzodiazepine-7-sulfonamide, M.P. 225–226° C.

*Analysis.*—Calcd. for $C_{15}H_{15}ClN_4SO_2$ (percent): C, 51.35; H, 4.31; N, 15.97; Cl, 10.10; S, 9.14. Found (percent): C, 51.77; H, 4.57; N, 16.26; Cl, 9.80; S, 9.30.

In a similar manner, 2-amino-5-bromo-2′-chloro-5′-sulfamoylbenzophenone is reacted with ethylene diamine to yield 5-(2-amino-5-bromophenyl)-2,3-dihydro-1H-1,4-benzodiazepine.

EXAMPLE II

A mixture of 15.0 g. of 2-amino-2′-chloro-4-methyl-5′-sulfamoylbenzophenone and 75 ml. of ethylene diamine are refluxed for ten hours. Thereafter, the excess amine is removed in vacuo and the residue dissolved in methanol and precipitated by the addition of water to afford 5-(2-amino - 4 - tolyl) - 2,3 - dihydro - 1H - 1,4 - benzodiazepine-7-sulfonamide.

Similarly, 5-(2-amino-5-propylphenyl)-2,3-dihydro-1H-1,4-benzodiazepine-7-sulfonamide is synthesized.

EXAMPLE III

Repeating the procedure of Examples I and II to react an -appropriate 2-amino-2′-chloro-5′-sulfamoylbenzophenone with ethylene diamine, the following compounds are obtained:

5-(2-amino-4-methoxyphenyl)-2,3-dihydro-1H-1,4-benzodiazepine-7-sulfonamide;
5-(2-amino-5-fluorophenyl)-2,3-dihydro-1H-1,4-benzodiazepine-7-sulfonamide;
5-(2-amino-3-ethylphenyl)-2,3-dihydro-1H-1,4-benzodiazepine-7-sulfonamide;
5-(2-amino-5-ethoxyphenyl)-2,3-dihydro-1H-1,4-benzodiazepine-7-sulfonamide;
5-(2-amino-4-butoxyphenyl)-2,3-dihydro-1H-1,4-benzodiazepine-7-sulfonamide; and
5-(2-aminophenyl)-2,3-dihydro-1H-1,4-benzodiazepine-7-sulfonamide.

What is claimed is:

1. A compound selected from the group consisting of those having the formula:

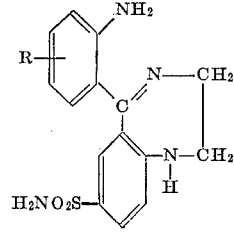

wherein R is selected from the group consisting of hydrogen, halogen, lower alkyl and lower alkoxy; and the biologically acceptable acid addition salts thereof.

2. A compound as described in claim 1 which is: 5-(2-amino - 5 - chlorophenyl) - 2,3 - dihydro - 1H - 1,4 - benzodiazepine-7-sulfonamide.

3. A compound as described in claim 1 which is: 5-(2-amino - 5 - bromophenyl) - 2,3 - dihydro - 1H - 1,4 - benzodiazepine-7-sulfonamide.

4. A compound as described in claim 1 which is: 5-(2-amino - 4 - tolyl) - 2,3 - dihydro - 1H - 1,4-benzodiazepine-7-sulfonamide.

5. A compound as described in claim 1 which is: 5-(2-aminophenyl) - 2,3 - dihydro - 1H - 1,4 - benzodiazepine-7-sulfonamide.

References Cited

UNITED STATES PATENTS 3,222,359  12/1965  Reeder et al. _____ 260—239

ALTON D. ROLLINS, Primary Examiner

U.S. Cl. X.R.
260—556, 999